United States Patent Office 2,952,763
Patented Sept. 13, 1960

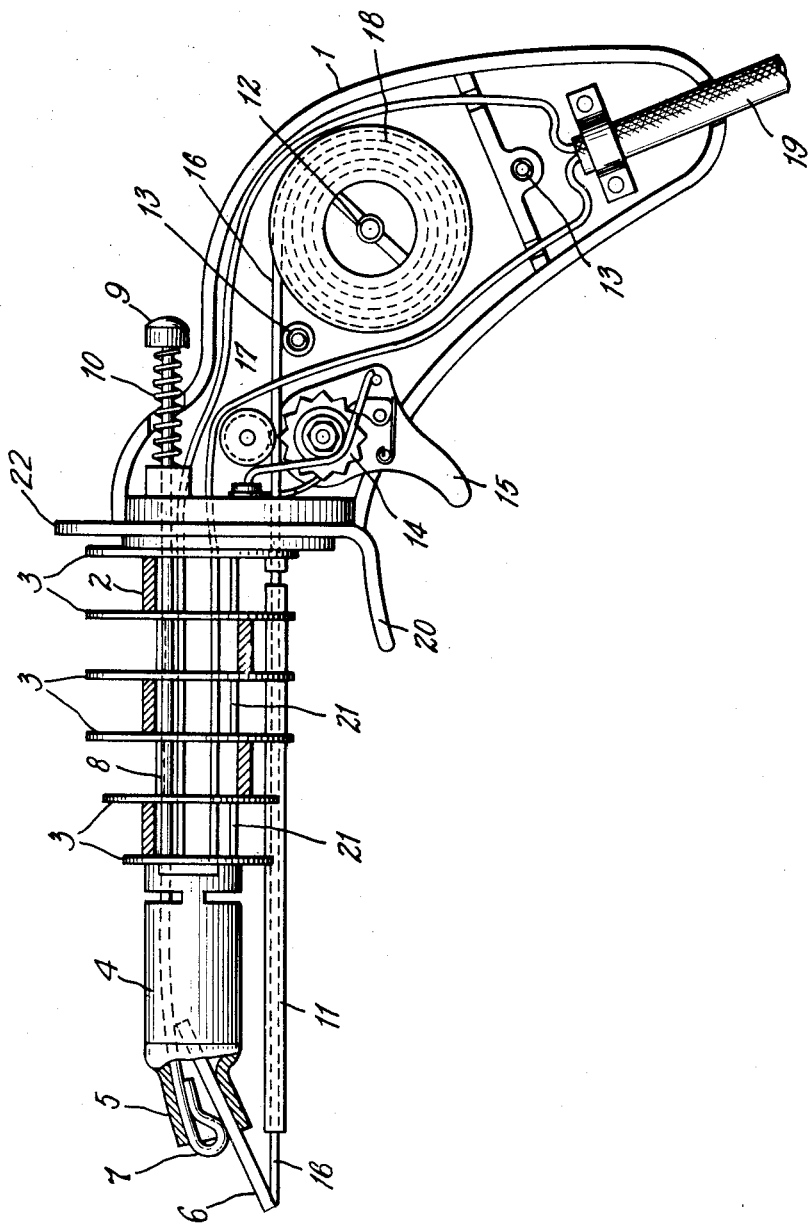
Sept. 13, 1960  A. GUSTAFSSON  2,952,763
SOLDERING TOOL WITH SOLDER CHAMBER AND
FEEDING DEVICE FOR ONE HAND
Filed March 20, 1958
INVENTOR.
AMUTH GUSTAFSSON
BY *Walter S. Bleston*
ATTORNEY

2,952,763

SOLDERING TOOL WITH SOLDER CHAMBER AND FEEDING DEVICE FOR ONE HAND

Amuth Gustafsson, % AB Nordens Frimarken, 11 Halsingegatan, Stockholm, Sweden

Filed Mar. 20, 1958, Ser. No. 723,622

Claims priority, application Sweden Mar. 30, 1957

6 Claims. (Cl. 219—27)

The present invention relates to an electric soldering tool of the pistol type wherein a supply of solder can be received in the pistol handle and the feeding of the solder to the soldering tip is controlled by a trigger.

It is an object of the invention to provide a tool of the mentioned type wherein the soldering tip, extending with its rear end into a heating element, is readily lengthwise shiftable and exchangeable and insertable into the heating element so as to be easily replaceable when worn or corroded.

It is another object of the invention to provide such tool with a solder chamber in which the solder is kept either in the form of wire, strips, bars, rods or pellets or small particles of other shape, and from which container it can then, according to desire, be fed with the aid of one finger or by an automatic device, which may be of the spring type, i.e. of a material having expandable and contractible properties.

It is a further object of the invention to provide the tool with a handle of plexiglass serving as solder chamber, in which a solder reel may be enclosed, a tube being secured to the front of the handle so that both are incorporated into one tool containing an electric heating element at the front portion of the tube and, at the foremost end of the tool, the soldering tip, preferably in the form of a chromium-plated exchangeable, downwardly pointed copper tip.

The invention also aims to provide below the first mentioned tube a thinner tube attached to it in such a manner that the solder wire from the reel in the handle can be fed as required through the thinner tube towards the electrically heated downward-bent soldering-tool tip.

The invention further aims to provide cooling flanges or cooling apertures in the soldering tool in order to carry off the heat from that part of the tool where it may cause harmful effects.

Further objects and details of the invention will be apparent from the description given hereinafter and the accompanying drawing illustrating an embodiment thereof by way of example. In the drawing the sole figure is a side elevation partly in section, of a soldering tool according to the invention, the cover of the handle being removed.

Referring to the drawings, the figure shows a pistol-like tool, the handle 1 of which is designed in the shape of a small box with an attached lid (not shown) rendering the contents readily accessible. The lid may be attached by means of screws for which holes 13 are provided.

The handle is attached to a tubular body 2 provided with air-cooling apertures or recesses 21 and flanges or ribs 3 and having an electric heating element 4 in its front part. The heating element includes a downwardly directed ovally compressed beak-like hollow extension 5 into which a loose soldering tip e.g. a copper wire 6 can be easily introduced and inserted at the front of the heating element. For this purpose a soldering-tip release is provided and adapted to hold the tip and to push it forward when actuated by the user's finger pressure. The tip release comprises a shiftable rod or wire 8 which extends lengthwise through the upper portion of the handle 1, the tube 2, and the heating element 4. The rear end of the rod is provided with a knob or head 9 and the front end 7 is bent to form a loop bearing against the soldering tip 6 and the upper inner surface of the beak 5. A helical compression spring 10 is interpositioned between the head 9 and a rigid portion of the handle and tends to push the rod 8 rearwards. Thereby the loop 7 keeps and holds the copper solder tip in position in the front part of the heating element.

Below the tubular soldering-tool body a smaller tube 11 is spaced from but attached to it. Tube 11 extends towards the forward end of the soldering tip 6 and is passed through the cooling ribs or flanges 3 to which it is secured. Approximately in the center of the hollow handle 1 an axle 12 is arranged about which a reel of soldering wire 18 can rotate.

A feeding device in the form of one or more wheels or, in this particular case a detent-provided cogwheel 14 run by a trigger 15 urges with its teeth the solder wire 16 forward and against another wheel 17. From the solder wheel 18 in the handle of the soldering tool the solder runs into and through the solder tube 11 to the soldering tip 6.

A wall 22 between handle 1 and the tubular member 2 is provided with openings for the passage of the rod 8 and the solder 16 which is fed to the tube 11. The wall 22 has a downward extension 20 so as to form a shield to protect the user's fingers against the heat from the heating element.

The necessary electric wires 19 for the generation of heat in the heating element are placed in the handle of the soldering tool. They extend through the wall 22 and the tubular member 8 to the heating element. After the electric current has been connected, the heating element starts functioning and the soldering tip is heated. The result is that the solder wire propelled towards it melts and the soldering operation can be started.

The cooling flanges, the purpose of which is to carry off the superfluous heat from the front part of the tool and thus to protect the rear parts, consist of sheet-metal lugs big enough to permit the tool to be laid down almost anywhere without risking an ignition of the surroundings of the tool.

The tin solder or, generally, whatever solder is being used, may be in the shape of rods, bars or wire, or even pellets, which can be fed through a channel to the soldering head or nozzle in any convenient way. The feeding of the solder can take place by means of notched wheels, friction wheels or similar contrivances designed so as to be controlled with the same hand that holds the soldering apparatus.

It will be apparent to those skilled in the art that many modifications and alterations of the structure illustrated and described may be made without departure from the spirit and essence of the invention which for that reason shall not be limited but by the scope of the appended claims.

Having thus described my invention, what I claim is:

1. An electrical soldering tool of the pistol type comprising a hollow handle constituting a receptacle for a supply of solder, a heating element, a soldering tip, said heating element including at its front end a substantially tubular extension adapted to receive said soldering tip therein, said soldering tip being detachably inserted with its rear end portion in said tubular extension and projecting therefrom with its front end, a clamping means operative at the tool handle and extending from the latter to said extension to clamp or release said soldering tip therein, a tubular body of substantial length secured with its rear end to said handle and carrying at its front end said heating element, a guiding means below said tubular member and said heating element and adapted to conduct solder from said supply to the front end of said soldering tip, said guiding means being attached to said handle and to said tubular member but spaced from the latter and entirely separated from said heating element, the length of said tubular member and the spacing between said heating element and the path of the solder defined by said guiding means being so selected that the solder on its path to said soldering tip is protected against premature melting and that excessive heat is kept away from said handle.

2. A soldering tool as in claim 1, said extension of said heating element being downwardly inclined and having a hollow substantially beak-like shape, said soldering tip being detachably inserted in said beak-like extension so as to project with its rear end portion into the body of said heating element, said clamping member extending from the rear of said handle into said beak-like extension so as to clamp said soldering tip therein, and a means connected with said clamping member at the rear end thereof and operative by a finger of the user's hand to shift said member so as to release said soldering tip.

3. A soldering tool as in claim 2, said clamping member including a shiftable rod and said handle including an upper portion through which said rod extends with its rear end to the outside, said rod extending forward through said tubular member and said heating element, the front end of said rod being shaped in the form of a loop bearing against said soldering tip and the upper inner surface of said beak-like extension, a knob being secured to the rear end of said rod outside of said handle, and a compression spring being inserted between said knob and a portion of said handle.

4. A tool as in claim 2, said soldering tip consisting of a straight piece of copper wire so that it may be attached to said heating element with either end.

5. An electrical soldering tool comprising a hollow handle constituting a receptacle for a supply of solder, a tubular body of substantial length secured to said handle and extending forward thereof, spaced cooling ribs secured to said body in planes substantially at right angles thereto, a heating element secured to the front end of said body and extending coaxial therewith and forward thereof, a substantially rod-shaped soldering tip releasably attached to said heating element at an acute angle with respect to the direction in which said body and said element extend, a clamping means adapted to hold said tip attached to said element, said clamping means extending rearward through said tubular body and said handle and including means at its rear end in reach of a finger of the user's hand holding said handle to operate said clamping means in order to release said tip, a guiding means below and substantially parallel to said tubular body and said heating element and entirely separate therefrom and adapted to conduct solder from said supply to the front end of said soldering tip, said guiding means being passed through said ribs and secured thereto at such a distance from said body and said element that in said guiding means melting of said solder by heat from said element prematurely before reaching said tip is prevented, and another means in reach of a finger of the user's hand holding said handle to advance said solder from said supply to said tip.

6. A soldering tool as in claim 5, further comprising a front wall of said handle, the rear end of said tubular body being secured to said front wall, said front wall being provided with a first hole in communication with said tubular body for the passage of said clamping means therethrough and with a second hole in registry with said guiding means for the passage of said solder, the peripheral contours of said front wall and of said ribs extending beyond the peripheral contour of a cross-section through said element and said guiding means, and said front wall extending downward from said handle in front of said other means.

References Cited in the file of this patent

UNITED STATES PATENTS

| | | |
|---|---|---|
| 538,695 | Osborne et al. | May 7, 1895 |
| 1,691,052 | Fay | Nov. 13, 1928 |
| 2,432,428 | Lang | Dec. 9, 1947 |
| 2,447,110 | Bitzenburger | Aug. 17, 1948 |
| 2,454,875 | Hyde | Nov. 30, 1948 |
| 2,765,390 | Chapel et al. | Oct. 2, 1956 |
| 2,797,293 | Weber | June 25, 1957 |

FOREIGN PATENTS

| | | |
|---|---|---|
| 390,139 | Great Britain | June 25, 1931 |
| 494,419 | Great Britain | Oct. 21, 1938 |
| 507,997 | Great Britain | June 22, 1939 |
| 887,436 | Germany | Aug. 24, 1953 |